I. B. HAGAN, Sr.
MEASURING INSTRUMENT.
APPLICATION FILED JUNE 12, 1909.
964,246.
Patented July 12, 1910.
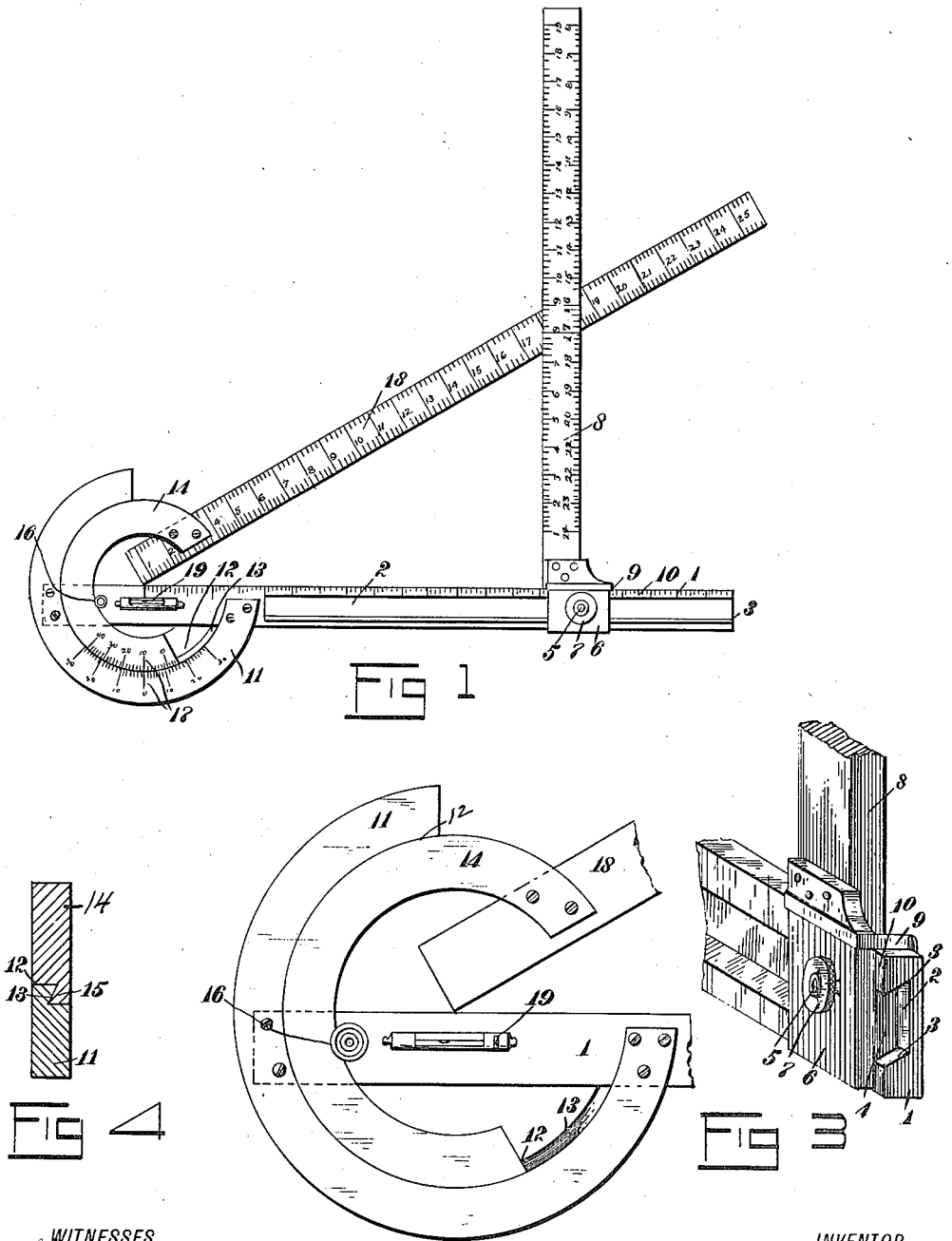

UNITED STATES PATENT OFFICE.

IRA B. HAGAN, SR., OF LAMOINE, MAINE.

MEASURING INSTRUMENT.

964,246. Specification of Letters Patent. Patented July 12, 1910.

Application filed June 12, 1909. Serial No. 501,747.

*To all whom it may concern:*

Be it known that I, IRA B. HAGAN, Sr., a citizen of the United States, and a resident of Lamoine, in the county of Hancock and State of Maine, have invented a new and Improved Measuring Instrument, of which the following is a full, clear, and exact description.

My invention relates to instruments for use by those desiring to measure angles, and it embodies several novel features of construction, which produce a more serviceable device than those hitherto known.

In this specification I will describe the preferred form of my invention, it being understood that the scope of the invention is defined in the appended claims.

Reference is to be had to the accompanying drawings forming a part of this specification in which similar characters of reference indicate corresponding parts in all the views.

Figure 1 is a side elevation of the invention; Fig. 2 is an enlarged view of the protractor members; Fig. 3 is a fragmentary view showing the construction of the slide and the base; and Fig. 4 is a sectional view showing the arrangement of one of the protractor members with reference to the other protractor member.

By referring to the drawings it will be seen that a base 1 is provided which is elongated and has a longitudinally disposed groove 2, the top and bottom 3 of the groove 2 being disposed substantially parallel and at an angle to the face of the base 1. Disposed in this groove 2 is a tongue 4, the tongue 4 being constructed angular so that it fits the groove 2 and is adapted to slide therein. The tongue 4 has secured to it a screw 5, which projects through an orifice in the slide 6, a nut 7 being provided to engage the terminal of the screw 5.

On the slide 6 there is a perpendicularly disposed rule 8, and the slide 6 also has a member 9 which projects over the top of the base 1, and has a terminal disposed against the side of the base 1 opposite the body of the slide 6. The upper side of the groove 2 forms with the face 10 of the base 1 an acute angle so that when the nut 7 is turned down on the screw 5, a portion of the base 1 will be gripped between a surface of the tongue 4 and the body of the slide 6.

Secured to one end of the base 1 there is a protractor member 11, which is preferably annular in shape with a circular opening 12, there being a V-shaped groove 13 in the annular protractor member 11, one side of which is cut off a distance from the face of the protractor member 11 to form the circular opening 12. A second annular protractor member, the diameter of which is substantially the same as the diameter of the opening 12, is disposed in the said opening, the protractor member 14 having an annular flange 15, which fits the annular recess 13 in the protractor member 11. A button 16 is mounted on the base 1 and projects over the protractor member 14 to prevent the protractor member 14 from becoming displaced. As the protractor members are disposed the protractor member 14 is adapted to rotate relatively to the protractor member 11. There are preferably scales 17 on each of the protractor members 11 and 14, the scale on one of the protractor members being in close proximity to the scale on the other protractor member, but without departing from my invention, one of the protractor members may be provided with a scale and the other protractor member may be provided with an index mark so that the degree of movement of one of the protractor members relatively to the other may be determined.

On the inner protractor member 14 is mounted an angle rule 18, which is disposed across the perpendicular rule 8. Mounted on the base 2 is a spirit level 19, which may have detachable fastenings, not shown, which will permit of its ready removal from the base 1.

When the several parts are constructed and mounted as has been described, and when the inner protractor member 14 is rotated relatively to the protractor member 11, the angle rule 18 is moved to or from the base 1, which decreases or increases the angle which may be determined by the examination of the scales, as is well-known to those who are familiar with the art.

Having thus described my invention, I claim as new and desire to secure by Letters Patent:

1. In a measuring instrument, a base having a face and an edge disposed at an angle thereto, there being a longitudinal groove in the base, which extends through the face, the opposite sides of the grooves being substantially parallel and disposed at an angle with the face, a tongue disposed in the groove, a screw mounted on the tongue, a slide having an orifice through which the screw is disposed, a nut for the screw, a member secured to the slide disposed against the edge of the base, and a rule mounted on the slide.

2. In a measuring instrument, a base, a protractor member having a face and a circular opening which extends therethrough, secured to the base, there being an annular recess V-shaped in cross section in the protractor member, one of the sides of the recess extending through the face, the other side extending to the opening at a distance from the plane of the face, a second protractor member annular in shape disposed in the opening in the first protractor member, the second protractor member having an annular flange, V-shaped in cross section, disposed in the annular recess, there being a scale on one of the protractor members, a slide mounted to travel longitudinally of the base, a rule mounted on the slide, and a rule carried by the second protractor member which is disposed in the direction of the first-mentioned rule.

3. In a measuring instrument, a base, a protractor member having a face and a circular opening which extends therethrough, secured to the base, there being an annular recess V-shaped in cross section in the protractor member, one of the sides of the recess extending through the face, the other side extending to the opening at a distance from the plane of the face, a second protractor member annular in shape, disposed in the opening in the first protractor member, the second protractor member having an annular flange V-shaped in cross section, disposed in the annular recess, there being a scale on the first-mentioned protractor member in close proximity to its circular opening, a slide mounted to travel longitudinally of the base, a rule mounted on the slide, a rule mounted on the second protractor member which is disposed in the direction of the first-mentioned rule, and a button on the base which projects over the second protractor member.

In testimony whereof I have signed my name to this specification in the presence of two subscribing witnesses.

IRA B. HAGAN, Sr.

Witnesses:
C. W. Eaton,
M. E. Holmes.